R. E. HELLMUND.
SYSTEM OF CONTROL FOR ALTERNATING CURRENT COMMUTATOR MOTORS.
APPLICATION FILED SEPT. 28, 1917. RENEWED MAR. 10, 1920.
1,338,368. Patented Apr. 27, 1920.
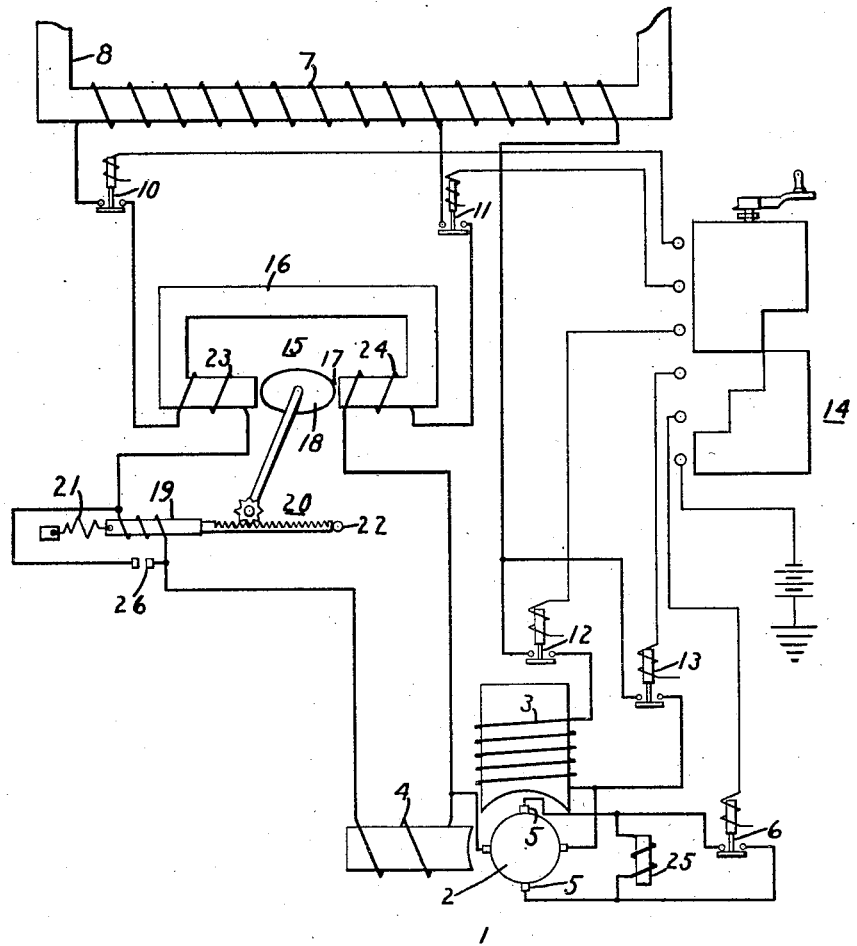
WITNESSES:
Olen E. Bee.
William C. McCoy.
INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL FOR ALTERNATING-CURRENT COMMUTATOR-MOTORS.

1,338,368.     Specification of Letters Patent.     Patented Apr. 27, 1920.

Application filed September 28, 1917, Serial No. 193,693. Renewed March 10, 1920. Serial No. 364,757.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control for Alternating-Current Commutator-Motors, of which the following is a specification.

My invention relates to systems of control for alternating-current commutator motors, and it has for its object to provide a system of the character designated which shall be simple and inexpensive in construction and arrangement and flexible and effective in operation, permitting not only control of the speed and of the power factor but also of the degree of compensation to insure proper commutation for various conditions of load on the motor.

The single figure of the accompanying drawing is a diagrammatic view of a single-phase alternating-current motor arranged for stator and rotor excitation and provided with attendant supply and control circuits and apparatus embodying a desirable form of my invention.

Alternating-current motors of the inducing-field commutator type are well known in which the transformer-conduction system of connections is employed. The inducing field winding is connected across one portion of the source and the armature winding is connected across a different portion. Thus, the voltage impressed upon each of these working windings may be independently varied. It is usual to provide the inducing-field winding with twice as many turns as the armature winding and, as a result of the transformer action therebetween, substantially one-half the armature current flows to the source through the inducing field winding and the remainder flows to the source through the intermediate tap. The magnetizing current for the inducing-field winding, however flows to said winding at one terminal thereof and from said winding at the other, the inducing-field magnetizing current is therefore added to one-half of the armature current in one inducing-field supply lead and is subtracted from the other half of the armature current in the other inducing-field lead. If, under the above-described conditions, the intermediate tap is shifted in order to vary the armature impressed voltage there results such a change of the voltage impressed upon the inducing-field winding as to change the magnetizing current thereof and, accordingly, the strength of the inducing or compensating field. In armature-excited motors wherein the exciting or magnetizing field is produced by armature conductors cutting the inducing field, there results a speed change because of the variation in the inducing field flux.

If a transformer-conduction motor have a one-to-one ratio between the inducing field and armature windings, all of the armature current flows through the inducing field winding and only the inducing-field magnetizing current flows in the intermediate tap. Under these conditions, movement of the intermediate tap does not affect the effective armature voltage, and control of the inducing-field strength may be obtained independently of the effective armature voltage.

By my invention, I employ a special two-part induction device so associated with the supply conductors of a motor that the above-noted independent adjustments of the effective armature voltage and of the inducing-field strength may be obtained while still employing the desirable two-to-one ratio between the inducing field and armature turns. In this manner, by the independent control of the inducing-field strength, I am enabled, in armature excited motors, to obtain desirable speed and power-factor control, as will hereinafter more fully appear, and also to correct the degree of compensation for varying degrees of load that are imposed upon the motor.

The single diagrammatic view of the drawing illustrates an alternating-current motor 1 of the single-phase commutator type having an armature 2, a magnetizing-field winding 3 and a compensating or inducing-field winding 4. Said motor is further provided with a pair of magnetizing brushes 5—5 which may be interconnected by the closure of a suitable switch 6 to provide armature excitation. The brushes 5—5 are preferably permanently connected by an inductive reactor 25 that is adapted to be close-circuited by the switch 6 for certain operating positions. Energy for the operation of the motor may be derived from any suitable source, such, for example, as the secondary winding 7 of the transformer 8, in accordance with the well-known transformer-conduction system of connections. Switches 10, 11, 12 and 13 and a controller 14 are employed for modifying the connections between the motor and the transformer.

An inductive reactance device 15 which comprises a core member 16 having an adjustable air gap at 17 that may be closed in varying degrees as by a movable armature member 18, is interposed in the intermediate motor tap and the outer inducing field lead. The armature 18 is of oval shape and is rotatably mounted in order that the air gap 17 may be changed in varying degrees, either manually when the switch 26 is closed or automatically in accordance with the current through the inducing-field winding 4. A magnetic core 19, to which the armature 18 is operatively connected by a rack and pinion 20, is held in the position shown in the drawing by a spring 21 and a stop 22 when the coil for the core 19 is not energized. As soon as a predetermined value of current flows through the coil for the core 19, the core is drawn to the left and the armature 18 is rotated to increase the air gap 17. The reactor 15 is, furthermore, provided with two windings 23 and 24 which are connected, respectively, to the outer and inner inducing-field supply leads. The inducing-field winding 4 preferably has substantially twice as many turns as the armature winding 2.

In order to manually operate the system thus described, the switch 26 is closed and switches 10, 11 and 12 are closed by moving the controller 14 to its first position. The armature member 18 may be set in its vertical position for which the reluctance of the core member 16 is at a maximum. The motor is thus connected for transformer-conduction operation, with the magnetizing field winding 3 in circuit. Further movement of the controller 14 first closes the switch 6, interconnecting the exciting brushes 5—5 and then eliminating the magnetizing field winding 3 from circuit by opening the switch 12 and closing the switch 13. The motor is now connected in such manner that the magnetizing field is produced by the flow of current through the armature winding and the brushes 5—5. This exciting current is induced in the armature winding by the cutting of the inducing-field flux. Substantially one-half the armature current traverses the inducing-field winding 4 and the winding 23 and the remainder of the armature current traverses the winding 24 and the intermediate tap. The windings 23 and 24 are so arranged that their inductive effects upon the core 16, produced by the armature current, neutralize each other, and these windings are, therefore, substantially non-inductive to the armature or load current. The magnetizing current for the inducing-field winding 4, however, flows from the source through the winding 24, the field winding 4 and the winding 23 so that the magnetizing effects thereof in the windings 23 and 24 are cumulative. The flux produced by the inducing field winding is a maximum when the armature member is in its upright position, since the choking effect of the device upon the magnetizing current 15 is then at a minimum. A strong inducing-field magnetization and a relatively low motor speed therefore results for this setting of the armature member 18.

The armature member 18 may now be gradually moved to its illustrated position in order to increase the choking effect of the device 16 and thus gradually reduce the magnetic flux from the inducing-field winding 4. This change in the position of the armature member 18 weakens the inducing-field flux and, consequently, the motor speed is increased.

If automatic adjustment of the commutating conditions and power-factor of the motor are desired, the switch 26 is opened which permits the coil 19 to operate the rack and pinion 20 to adjust the armature 18 in accordance with the degree of load imposed upon the motor. It will be understood that the initial current rush will turn the armature 18 to a vertical direction and that, as the current decreases, the armature gradually returns to the illustrated position, thus providing an adjustment of the compensating flux that is proportional to the load current of the motor.

Particular attention should be directed to the fact that, because of the two-to-one ratio existing between the inducing-field turns and the armature turns, the portion of the working current flowing through each of the two windings 23 and 24 is, at all times, substantially the same so that these windings neutralize the magnetic effects of each other which are due solely to the working current. Thus, the movement of the member 18 has substantially no effect upon the armature or working current.

If the number of turns in the inducing-field winding bears a ratio other than two to one to the number of turns in the armature winding, it is necessary to vary the relative numbers of turns in the windings 23 and 24 in order that the ampere turns produced in the winding 23 by the passage of the portion of the load current flowing therethrough shall be substantially equal and opposite to the ampere turns produced in the winding 24 by the passage of the portion of the load current flowing therethrough. Thus, if the inducing-field winding have three times as many turns as the armature winding, one third of the armature current traverses the outer inducing-field supply lead and two-thirds traverses the inner inducing-field supply lead. In more general terms, if the inducing-field winding have "$n$" times as many turns as the armature winding, $\frac{1}{n}$th of the armature current traverses the outer inducing-field supply lead and $\frac{n-1}{n}$ thereof traverses the inner inducing-field supply lead. Thus, the winding in the outer lead should have ($n-1$) times as many turns as the winding in the inner lead in order to render the windings non-inductive to load current.

It should be noted that the variation of the exciting voltage induced between the exciting brushes causes a variation of the amount of wattless component of voltage induced within the motor. Thus, the power-factor of the motor may be adjusted by the movement of the armature member 18 and, by simultaneously adjusting the motor voltage to maintain the speed at constant value, an extremely desirable control is obtained. Furthermore, it frequently happens that the small amount of speed change producing the adjustment of the torque-field strength necessary to correct the power-factor may be disregarded.

Attention should further be directed to the fact that, for the second operating position of the controller 14, the stator magnetizing field winding 3 is employed whereas for the succeeding steps this field winding is idle. Thus, during operation on the second controller position, a portion of the magnetizing excitation is produced within the stator and a portion within the rotor whereas, for the latter position, the excitation is entirely produced by the armature winding. The effect of adjusting the member 18 is manifest only in that component in that magnetizing-field excitation which is produced in the armature, and the motor connections for the second controller position are thus not as sensitive to adjustments in the member 18 as is the latter position. It will, therefore, be understood that the degree of effect upon the motor speed that is produced by moving the armature member 18 may be varied by changing the number of turns upon the stator magnetizing turns.

I have shown the reactance-adjusting member 15 in its simplest form and adapted for manual or automatic operation, it will be understood that it may be adjusted automatically, by any desired means, in accordance with either the load or the speed of the motor.

While I have shown and described my invention in a plurality of forms, it will be obvious to those skilled in the art that it is capable of application to all forms of dynamo-electric machinery embodying armature excitation derived from a suitably disposed field winding. I desire, therefore, that only such restrictions shall be placed thereupon as are imposed by the prior art or as are specifically set forth in the appended claims.

I claim as my invention:

1. The combination with an alternating-current commutator motor having an inducing-field winding and an armature winding, of a main supply-circuit transformer, an inductive device permanently connected in series-circuit relation with said inducing-field winding across a portion of said main transformer, and means for changing the reactance of said device in accordance with the load imposed upon said motor.

2. The combination with the inducing-field winding of a transformer-conduction motor, of current-controlling apparatus connected thereto which is substantially non-inductive to the load current of said motor and inductive to the magnetizing current for said inducing-field winding, said apparatus embodying means for automatically changing the magnetizing current for said winding in accordance with the load imposed upon said motor.

3. The combination with a transformer-conduction motor provided with substantially twice as many inducing field turns as armature turns, of a source of alternating current, inner and outer inducing-field supply leads for connecting said motor to said source of alternating-current, inductively related windings having substantially equal numbers of turns inserted in said supply leads, said windings being connected so that their magnetomotive forces are mutually opposed, and means for varying the reluctance of the magnetic path interlinking said inductively related windings.

4. The combination with an armature excited alternating-current commutator motor having "$n$" times as many turns in the inducing-field winding as in the armature winding and having supply leads at each terminal of the inducing field winding, of inductively related windings in said supply leads, the winding in the outer supply lead having ($n-1$) times as many turns as that in the inner supply lead, the magnetomotive forces of said windings produced by the flow of load current therethrough being in opposition, and means for varying the reluctance of the magnetic path interlinking said inductively related windings.

5. The combination with a doubly-fed motor, of a source of alternating-current inner and outer inducing field leads from said source to said motor, inductively related windings inserted in said leads, said windings being so connected that the magnetomotive forces thereof, due to the flow of load current therethrough, are in opposition, and means for varying the reluctance of the magnetic path interlinking said two windings.

6. The combination with a doubly-fed motor provided with "$n$" times as many inducing-field turns as armature turns, of a source of alternating current, inner and outer inducing-field supply leads from said source to said motor, inductively related windings inserted in said supply leads, the number of turns in the winding inserted in the outer inducing-field lead having $(n-1)$ times the number of turns in the winding inserted in the inner inducing field lead, said windings being connected so that their magnetomotive forces are mutually opposed, and means for varying the reluctance of the magnetic path interlinking said two windings.

7. The combination with the inducing-field winding of a transformer-conduction motor, of current-controlling apparatus connected thereto which is substantially non-inductive to the load current of said motor and inductive to the magnetizing current for said inducing-field winding.

8. The combination with a doubly-fed motor, of a source of alternating-current, inner and outer inducing field leads from said source to said motor, and inductively related windings inserted in said leads, said windings being so connected that the magnetomotive forces thereof, due to the flow of load current therethrough, are in opposition.

In testimony whereof, I have hereunto subscribed my name this 11th day of Sept., 1917.

RUDOLF E. HELLMUND.